United States Patent
Liu et al.

(12)

(10) Patent No.: US 7,153,628 B2
(45) Date of Patent: Dec. 26, 2006

(54) COLOR-DEVELOPING AGENT RESIN COMPOSITION, EMULSION THEREOF AND METHOD FOR PREPARING THE SAME

(75) Inventors: Zonglai Liu, No. 92 Xinji Road, Xinxiang City He'nan Province 453003 (CN); Chunxuan Guo, Xinxiang (CN); Wei Zhang, Xinxiang (CN); Yuzhu Liu, Xinxiang (CN)

(73) Assignee: Zonglai Liu (CN)

( * ) Notice: Subject to any disclaimer, the term of this patent is extended or adjusted under 35 U.S.C. 154(b) by 115 days.

(21) Appl. No.: 10/820,605

(22) Filed: Apr. 8, 2004

(65) Prior Publication Data

US 2005/0095526 A1    May 5, 2005

(30) Foreign Application Priority Data

Oct. 29, 2003 (WO) .................. PCT/CN03/00916

(51) Int. Cl.
    G03C 1/73 (2006.01)
    G03F 7/004 (2006.01)

(52) U.S. Cl. .................. 430/270.1; 430/332; 430/338; 430/962; 503/203

(58) Field of Classification Search ............... 430/224, 430/138, 105, 331, 380, 270.1, 332, 338, 430/962; 503/203
See application file for complete search history.

(56) References Cited

U.S. PATENT DOCUMENTS

| | | | |
|---|---|---|---|
| 3,624,038 A | 11/1971 | Weidner | |
| 4,263,047 A | 4/1981 | Miyamoto et al. | |
| 4,468,486 A | 8/1984 | Matsushima et al. | |
| 5,017,546 A | 5/1991 | Brinkman et al. | |
| 5,376,615 A * | 12/1994 | Yamaguchi et al. | 503/216 |
| 5,447,901 A * | 9/1995 | Yamaguchi et al. | 503/210 |
| 5,647,896 A * | 7/1997 | Nishimura et al. | 106/31.18 |
| 6,124,077 A * | 9/2000 | Imai et al. | 430/281.1 |
| 2002/0168580 A1 * | 11/2002 | Kubota et al. | 430/200 |
| 2003/0224935 A1 * | 12/2003 | Watanabe et al. | 503/227 |
| 2004/0138076 A1 * | 7/2004 | Muir et al. | 508/460 |

FOREIGN PATENT DOCUMENTS

| | | |
|---|---|---|
| CN | 1043943 A | 7/1990 |
| CN | 1200378 A | 12/1998 |
| CN | 1247130 A | 3/2000 |
| JP | 1160678 | 6/1989 |

OTHER PUBLICATIONS

CN1200378A: Graft Copolymer of Modified Phenolic Resin and Metallic Carboxylate, https://www.delphion.com/details?pn=CN)1200378A, Jun. 3, 2004, 1 page.
CN1247130A: Developer for Non-Carbon Copying Paper, https://www.delphion.com/details?pn=CN01247130A, Jun. 3, 2004, 1 page.
CN1043943A: Resin Type Developed Material and Manufacturing, https://www.delphion.com/details?pn=CN01043943A, Jun. 3, 2004, 1 page.

* cited by examiner

Primary Examiner—Amanda Walke
(74) Attorney, Agent, or Firm—Myers Bigel Sibley & Sajovec

(57) ABSTRACT

The present invention relates to a color-developing agent resin composition, which contains: (1) a phenolic resin represented by formula I; and (2) a blend of graft copolymers of a phenolic resin and a multivalent metal salt polymer of a substituted aryl carboxylic acid, said graft copolymers are represented by (II) and (III). The present invention further relates to a resin emulsion containing the color-developing agent resin composition and a method for preparing the same. The color-developing agent resin composition and the color-developing agent resin emulsion of the present invention are used for no-carbon copying paper as special resin color-developing agents. They have advantages of not only fast developing at a low temperature and bright colors, but also heavy developing strength and good light-aging resistance of writing, and furthermore, their coatings are not easy to turn yellow when they are hold in the air, and the like.

23 Claims, No Drawings ial No. PCT/CN03/00916, filed Oct. 29,
COLOR-DEVELOPING AGENT RESIN COMPOSITION, EMULSION THEREOF AND METHOD FOR PREPARING THE SAME

CROSS-REFERENCE TO RELATED APPLICATIONS

The present application claims priority to International Application Serial No. PCT/CN03/00916, filed Oct. 29, 2003 the disclosure of which is incorporated herein by reference in its entirety.

FIELD OF THE INVENTION

The present invention relates to a color-developing agent resin composition.

BACKGROUND OF THE INVENTION

Special color-developing resin agents for no-carbon copying paper and methods for preparing such agent were studied in two process routes. The first route gave emphasis on using the single structure of zinc salicylates. Though this kind of resin has advantages of fast developing at a low temperature and developing good bright colors, the defects are that color-developing strength is light and light-aging resistance is poor, and the like. Representative examples include Japanese Laid-open Application No. 11-129614 discloses ingredients of a color-developing agent and pressure-sensitive copying materials prepared by using the color-developing agent. Japanese Laid-open Application No. 10-217607 discloses ingredients of a color-developing agent and pressure-sensitive copying materials prepared by using the color-developing agent. Japanese Laid-open Application No. 2001-261628 discloses a preparation method of multivalent metal salts of salicylic acid derivatives. Japanese Laid-open Application No. 2001-261629 discloses a method for preparing salicylic acid derivatives. Japanese Laid-open Application No. 2001-169424 discloses a method for preparing salicylic acid derivatives. Japanese Laid-open Application No. 2000-109448 discloses a method for preparing salicylic acid derivatives. Japanese Laid-open Application No. 2000-239224 discloses a method for preparing salicylic acid derivatives. Japanese Laid-open Application No. 2000-168231 discloses a method for preparing a color-developing emulsion used for pressure-sensitive paper. Japanese Laid-open Application No. 6-135132 discloses a method for preparing a color-developing emulsion used for pressure sensitive paper. Japanese Laid-open Application No. 6-293699 discloses a method for preparing salicylic acid derivatives and the use of metal salts thereof in color-developing agent. Japanese Laid-open Application No. 8-53536 discloses a method for preparing multivalent metal salts of salicylic acid resin and the use thereof. Japanese Laid-open Application No. 6-227117 discloses a method for preparing salicylic acid derivatives and the use of metal salts thereof in color-developing agent and the like.

Additionally, Chinese Patent Application Nos. 1031235A, 87107802A, 88102163A, 1229032A, 1247130A, 1276299A and 1040377A provide a single structure of zinc salicylate resins.

Another route emphasizes the single structure of phenolic resins. Though advantages of this kind of resin are that color-developing strength is heavy and light-aging resistance of writing is good, prominent disadvantages are that colors are not bright, its coating yellows easily when it is exposed to the air, and developing speed at a low temperature is slow. Representative patents include U.S. Pat. Nos. 54,020,185 and 5,017,546. The product is obtained by using an alkyl substituted phenol, formaldehyde and a metal compound as feedstocks to carry out the condensation reaction.

Chinese Patent Application No. 1200378A discloses a novel color-developing agent resin composition that is a blend of graft copolymers of a multivalent metal salt of an organic carboxylic acid and a phenolic resin. That application overcomes defects of the two kind of color-developing resin agents aforesaid. However, the composition still has disadvantages that developing speed at a low temperature is slow, colors are not bright, and the emulsion is difficult to stabilize.

SUMMARY OF THE INVENTION

The present invention illustrates a novel color-developing agent resin composition. The main component of the composition is a blend of graft copolymers of a multivalent metal salt polymer of an aryl carboxylic acid and a phenolic resin. The composition is used as a color-developing agent for no-carbon copying paper in order to overcome defects of both kinds of the resin color-developing agents aforesaid.

The present invention also illustrates a novel color-developing agent resin emulsion. It has the novel color-developing agent resin composition of the present invention as a main component.

Embodiments of the present invention include methods for preparing the novel color-developing agent resin composition of the present invention.

Other embodiments of the present invention include methods for preparing the novel color-developing agent resin emulsion of the present invention.

The present invention illustrates that the defects of previous color-developing agent resin compositions may be overcome by introducing a special structure of long chain alkenyl benzene. The present invention provides for a resin color-developing agent being formed, which has fast developing at a low temperature, bright color, heavy developing strength, good light-aging resistance of writing, and its coating is difficult to turn yellow.

DETAILED DESCRIPTION OF PREFERRED EMBODIMENTS

The present invention relates to a color-developing agent resin composition which contains:

(1) A phenolic resin represented by formula (I) as follows:

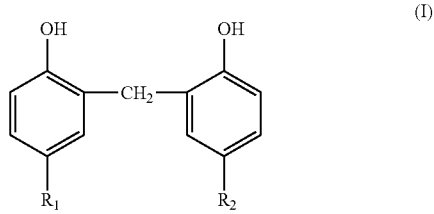

and (2) A blend of graft copolymers of a phenolic resin and a multivalent metal salt polymer of a substituted aryl carboxylic acid, said graft copolymers are represented by formula II and III respectively as follows:

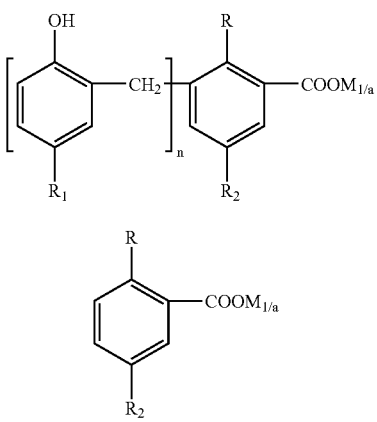

(II)

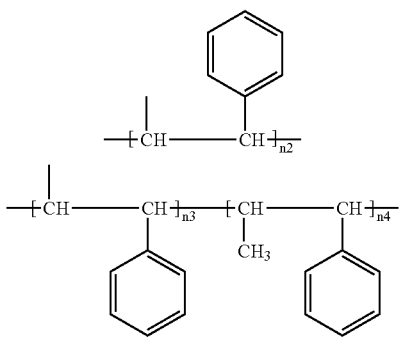

(III)

wherein,

R is $C_1$–$C_4$ linear alkyl, hydroxy or halogen;

$R_1$ is each individually $C_1$–$C_{12}$ linear or branched alkyl, $C_1$–$C_{12}$ halohydrocarbyl, $C_6$–$C_{12}$ aryl, $C_7$–$C_{12}$ aralkyl;

$n_1 = 1$–$2$

M is a multivalent metal ion;

a represents the valence of M;

$R_2$ has a structure as follows:

wherein $n_2$ is an integer of 1–100, preferably 1–10; $n_3 + n_4$ is an integer of 1–100, preferably 1–10.

The novel color-developing agent resin composition of the present invention is prepared through steps as follows:

(1) synthesizing the polymer of a substituted aryl carboxylic acid and an alkenyl benzene in the presence of a catalyst in an inert solvent by using the substituted aryl carboxylic acid or ester having a general formula (IV) as follows and an alkenyl benzene as feedstocks, and reacting the polymer with a multivalent metal ion to form a multivalent metal salt polymer of substituted aryl carboxylic acid as an intermediate;

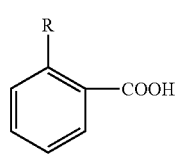

(IV)

wherein, the definition of R is the same as that above;

(2) melting the mixture of a p-substituted phenol, the substituted aryl carboxylic acid having a general formula (IV), a metal oxide and a catalyst, and reacting them;

(3) adding the intermediate of step 1 to the reaction product of step 2, and reacting at 80–150° C. for 30–150 minutes;

(4) reacting the reaction product of step 3 with an aldehyde under refluxing at 80–130° C. for 1–10 hours;

(5) dehydrating the reaction product of step 4 at a temperature of 90–150° C. under vacuum at 0.02–0.06 mPa; and (6) cooling the dehydrated product and milling to reach a required particle size range.

Wherein, the molar ratio of the substituted aryl carboxylic acid to p-substituted phenol is 0.05–1.55:1; the molar ratio of the metal oxide to substituted aryl carboxylic acid in step 2 is 0.02–1.30:1; the molar ratio of the metal salt of substituted aryl carboxylic acid top-substituted phenol in step 3 is 0.05–5.0:1; the molar ratio of the aldehyde to p-substituted phenol in step 4 is 0.06–2.0:1. It is desirable that the reaction is carried out under the protection of $N_2$ atmosphere.

The p-substituted phenol used for the preparation includes a linear chain alkyl- or isomeric alkylphenol, arylphenol, aralkylphenol or the mixture thereof, halogenated phenol and the like. In particular, it includes p-methylphenol, p-ethylphenol, p-propylphenol, p-butylphenol, p-tert-butylphenol, p-amylphenol, p-hexylphenol, p-heptylphenol, p-octylphenol, p-tert-octylphenol, p-nonylphenol, p-decylphenol, p-undecylphenol, p-dodecylphenol, and their isomers, p-chlorophenol, p-bromophenol, p-phenylphenol, p-phenyl alkylphenol and the like.

Said alkenyl benzene includes vinyl benzene, propenyl benzene, isopropenyl benzene, butenyl benzene, isobutenyl benzene, butadienyl benzene and the like.

Said substituted aryl carboxylic acid includes: $C_1$–$C_4$ linear alkylphenyl carboxylic acid, halophenyl carboxylic acid, salicylic acid and esters thereof Said metal oxide includes oxides of the following metals: Ca, Mg, Ba, Cu, Cd, Al, Zn, Cr, In, Sn, Co, Ni, Ti and the like.

Said aldehyde includes: formaldehyde, acetaldehyde, propionaldehyde, butyraldehyde, amylaldehyde, benzaldehyde and the like. The most often used is a formalin of 37% or 50% by weight.

Said inert organic solvent is one that contains no benzene such as organochlorines, alcohols, ethers, ketones and the like. In particular, it includes chloroethane, dichloroethane, trichloromethane, methanol, ethanol, propanol, butanol, isopropanol, isobutanol, dipropyl ether, diisopropyl ether, dibutyl ether, diisoamyl ether, acetone, butanone, pentanone, hexanone, hexanedione, heptanone, cyclohexanone and the like.

Said the multivalent metal salt polymer of substituted aryl carboxylic acid is preferably the polymer of zinc salt.

Said catalyst is generally acidic or basic catalyst, or a given surfactant.

In the presence of an emulsifying agent, the color-developing agent resin composition of the present invention is emulsified in an emulsifying machine to obtain an oil-in-water emulsion with the average particle size less than 1.5 μm.

The CF coating formulated by using the resin emulsion of the present invention is compared with CF coatings formulated by using resins of HRJ 14508 (as comparative product 1) sold by an American corporation in the international market and 80H (as comparative product 2) sold by a Taiwan corporation respectively. The results are obtained as follows:

TABLE 1

Comparison of CF coatings formulated by using
different resin color-developing agents for developing strength.
(Humidity RH 43% at a temperature of 20° C.)

| Resin | Developing value | | | Amount coated g/m² |
|---|---|---|---|---|
| | ΔE 10 sec. | ΔE 1 min | ΔE 24 hr | |
| Comparative product 1 | 68.16 | 74.62 | 76.68 | 5.58 |
| Comparative product 2 | 76.76 | 77.29 | 80.79 | 5.76 |
| The present invention | 81.58 | 81.86 | 84.91 | 5.60 |

TABLE 2

Comparison of CF coatings formulated by using
different resin color-developing agents for developing speed
Humidity RH43% at a temperature of 20° C.

| Resin | Developing value | | Differences | Amount coated g/m² |
|---|---|---|---|---|
| | ΔE 10 sec. | ΔE 1 min | ΔE 1 min − 10 sec | |
| Comparative product 1 | 68.16 | 74.62 | 6.46 | 5.58 |
| Comparative product 2 | 76.76 | 77.29 | 0.53 | 5.76 |
| The present invention | 81.58 | 81.86 | 0.28 | 5.60 |

TABLE 3

Comparison of CF coatings formulated by using
different resin color-developing agents for light aging property
Humidity RH43% at a temperature of 20° C.

| Resin | Light-aging of writing (UV lamp, for 4 hr) | | | Amount coated g/m² |
|---|---|---|---|---|
| | Developing value before aging | Developing value after aging | Retention % | |
| Comparative product 1 | 76.68 | 66.41 | 86.60 | 5.62 |
| Comparative product 2 | 80.79 | 71.74 | 88.80 | 5.57 |
| The present invention | 84.91 | 74.40 | 87.20 | 5.54 |

TABLE 4

Comparison of light-aged CF coatings formulated by using
different resin color-developing agents for developing value
Humidity RH43% at a temperature of 20° C.

| Resin | Light-aging of coatings (UV lamp, printed after 4 hr) | | | Amount coated g/m² |
|---|---|---|---|---|
| | ΔE 10 sec. | ΔE 1 min | ΔE 24 hr | |
| Comparative product 1 | 56.91 | 68.65 | 74.30 | 5.80 |
| Comparative product 2 | 72.99 | 74.15 | 76.74 | 5.75 |
| The present invention | 78.50 | 79.23 | 80.09 | 5.77 |

Test conditions:

1. An EPSEN-III type printer was used for all printing with 3rd gear and 4th couplet.

2. Developing value was measured by using SC-80 Model of color difference meter produced by Beijing Kang guang Corporation.

3. CF formulation was used with the same formulation and coated by hand.

4. CF formulation:

| | |
|---|---|
| Water | 70 ml |
| Dispersant agent | 1.3 g |
| Porcelain clay | 17.5 g |
| Calcium carbonate | 18 g |
| Calcined porcelain clay | 8.5 g |
| Starch gel(12%) | 65 ml |
| Resin | 17 g |
| SBR latex | 8 g |

5. Testing procedure for data: CF slurry was formulated according to CF formulation and coated onto a sheet of paper by hand, then the coated paper was dried in air and weighted, and the amount coated was calculated. After printing was completed on the EPSEN-III type printer with 3rd gear and 4th couplet, developing value was measured by using SC-80 Model of color difference meter and the humidity, temperature and aging condition were recorded.

The present invention is further illustrated through examples as follows:

EXAMPLE 1

By adding 300 parts by weight of salicylic acid, 300 parts by weight of isopropanol and 15 parts by weights of p-toluene sulfonic acid to an autoclave; adding 565 parts by weight of vinyl benzene within 5 hours through a high level tank at 80° C.; after feeding keeping the temperature and continuing the reaction under stirring for 2 hours; removing isopropanol, and adding 88 parts by weight of zinc oxide and reacting at 90° C. for 2 hours, the intermediate 1 was prepared to be used.

EXAMPLE 2

By adding 300 parts by weight of salicylic acid, 400 parts by weight of dichloroethane and 30 parts by weight of sulfuric acid to an autoclave; adding 512 parts by weight of propenyl benzene within 7 hours under stirring at 50° C. through a high level tank; after feeding keeping the temperature and continuing the reaction under stirring for 2 hours; adding 490 parts by weight of 5% sodium hydroxide to neutralize sulfuric acid; removing the water layer; washing the resultant material with 500 parts by weight of water; removing the water layer; distilling off dichloroethane; and then adding 90 parts by weight of zinc oxide and reacting at 95° C. for 4 hours, the intermediate 2 was prepared to be used.

EXAMPLE 3

By adding 300 parts by weights of salicylic acid, 500 parts by weight of cyclohexanone, 10 parts by weight of zinc chloride to an autoclave; adding 580 parts by weight parts by weight of butadienyl benzene within 4 hours through a high level tank under stirring at 70° C.; after feeding keeping the temperature and continuing the reaction under stirring for 2 hours; removing cyclohexanone; adding 95 parts by weight of zinc oxide and reacting at 100° C. for 6 hours, the intermediate 3 was prepared to be used.

EXAMPLE 4

By adding 300 parts by weight of methyl salicylate, 600 parts by weight of trichloromethane and 40 parts by weight of sulfuric acid to an autoclave; adding 334 parts by weight of butenyl benzene within 5 hours at 50° C. through a high level tank; after feeding keeping the temperature and continuing stirring for 2 hours; then adding 283 parts by weight of a 45% aqueous sodium hydroxide solution to hydrolyze for 4 hours while controlling the temperature at 100° C.; neutralizing the reaction mixture with sulfuric acid solution to pH 6; separating the water layer; washing the oil layer with 500 parts by weight of water, and distilling off trichloromethane; adding 80 parts by weight of zinc oxide and reacting at 100° C. for 6 hours, the intermediate 4 was prepared to be used.

EXAMPLE 5

By adding 180 parts by weight of tert-butylphenol, 25 parts by weight of salicylic acid and 8 parts by weight of zinc oxide to an autoclave; heating to melt the resultant mixture until all the materials were molten; adding 520 parts by weight of the intermediate 1; reacting for 1.5 hours while controlling the reaction temperature at 95° C.; adding 50 parts by weight of formaldehyde, then keeping the autoclave temperature at 102° C. to reflux for 1 hour; dehydrating under a vacuum at 0.07 mPa for 5 hours, and then discharging, cooling and milling, the color-developing agent resin composition 1 was obtained.

EXAMPLE 6

By adding 247 parts by weight of sec.-octylphenol, 40 parts by weight of salicylic acid, 12 parts by weight of zinc oxide and 8 parts by weight of p-toluene sulfonic acid to an autoclave; heating to melt the resultant mixture until all the materials were molten; adding 416 parts by weight of the intermediate 2; reacting for 1 hour while controlling the reaction temperature at 100° C.; adding 100 parts by weight of formaldehyde, then keeping the autoclave temperature at 102° C. to reflux for 2 hours; dehydrating under a vacuum at 0.06 mPa for 7 hours, and the discharging, cooling and milling, the color-developing agent resin composition 2 was obtained.

EXAMPLE 7

By adding 308 parts by weight of p-chlorophenol, 50 parts by weight of salicylic acid, 15 parts by weight of zinc oxide and 5 parts by weight of p-toluene sulfonic acid to an autoclave; heating to melt the resultant mixture until all the materials were molten; adding 624 parts by weight of the intermediate 3; reacting for 1 hour while controlling the reaction temperature at 105° C.; adding 100 parts by weight of formaldehyde, then keeping the autoclave temperature at 100° C. to reflux for 3 hours; dehydrating under a vacuum at 0.04 mPa for 8 hours, and then discharging, cooling and milling, the color-developing agent resin composition 3 was obtained.

EXAMPLE 8

By adding 342 parts by weight of p-phenylphenol, 50 parts by weight of salicylic acid, 14 parts by weight of zinc oxide and 3 parts by weight of p-toluene sulfonic acid to an autoclave; heating to melt the resultant mixture until all the materials were molten; adding 408 parts by weight of the intermediate 4; reacting for 30 minutes while controlling the reaction temperature at 110° C.; adding 120 parts by weight of formaldehyde, then keeping the autoclave temperature at 100° C. to reflux for 3 hours; dehydrating under a vacuum at 0.04 mPa for 8 hours, and then discharging, cooling and milling, the color-developing agent resin composition 4 was obtained.

EXAMPLE 9

By heating 400 parts by weight of the resin composition 1 prepared in Example 5 above, 28 parts by weight of polyvinyl alcohol, 2 parts by weight of a surfactant and 500 parts by weight of water at 120° C. for 2 hours; emulsifying and dispersing for 40 minutes to make the materials change from the water-in-oil type into the oil-in-water type; cooling the resultant emulsion to 40° C. and then discharging, checking and packaging, the color-developing agent resin emulsion 1 was obtained. Its performances are shown in Table 5:

EXAMPLE 10

Taking the same steps as those in Example 9, except that the color-developing agent resin compositions 2–4 were used instead of the color-developing agent resin composition 1, the color-developing agent resin emulsions 2–4 were obtained respectively. Their performances are shown in Table 5:

EXAMPLE 11

By heating 393 parts by weight of the resin composition 1 obtained in Example 5 above, 36 parts by weight of a modified starch, 1 parts by weight of a surfactant and 500 parts by weight of water at 120° C. for 2 hours; emulsifying and dispersing them for 40 minutes to make the materials change from W/O into O/W type; then cooling the emulsion to 40° C., and discharging, checking and packaging, the color-developing agent resin emulsion 5 was obtained. Its performances are shown in Table 5:

COMPARATIVE EXAMPLE 1

By adding 700 parts by weight of p-butylphenol, 130 parts by weight of salicylic acid, 30 parts by weight of zinc oxide, 2.0 parts by weight of ethyl benzenesulfonic acid; heating to melt them until all the materials were molten; adding 90 parts by weight of formaldehyde; then keeping the autoclave temperature at 100° C. to reacting under refluxing for 4 hours; adding 80 parts by weight of a salt of an organic carboxylic acid to react for 1 hour; dehydrating under a vacuum at 0.04 mPa while keeping the dehydration temperature at 120° C. until the dehydration was completed, then discharging, cooling, milling, emulsifying and dispersing, the comparative emulsion 1 was obtained. Its performances are shown in Table 5:

TABLE 5

Comparison of the color-developing agent emulsions of Examples for color-developing performances Humidity RH43% at a temperature of 20° C.

| Sample | Developing speed, ΔE 1 min – 10 sec | Developing strength, ΔE 24 hr |
|---|---|---|
| Color-developing agent emulsion 1 | 0.52 | 87 |
| Color-developing agent emulsion 2 | 0.59 | 88 |
| Color-developing agent emulsion 3 | 0.45 | 87 |
| Color-developing agent emulsion 4 | 0.35 | 86 |
| Color-developing agent emulsion 5 | 0.30 | 87 |
| Comparative emulsion 1 | 2.80 | 86 |

That which is claimed is:

1. A color-developing agent resin composition comprising:

Component 1: a phenolic resin comprising formula I

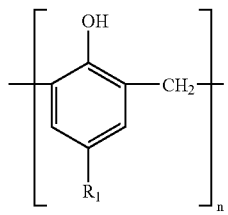

wherein n is an integer from 1 to 100; and

Component 2: a blend of graft copolymers of a phenolic resin and a multivalent metal salt polymer of a substituted aryl carboxylic acid, wherein at least a portion of said graft copolymers comprise formulas II and III

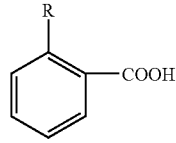

wherein

R is $C_1$–$C_4$ linear alkyl, hydroxy or halogen;

$R_1$ is individually $C_1$–$C_{12}$ linear or branched alkyl, $C_1$–$C_{12}$ halohydrocarbyl, $C_6$–$C_{12}$ aryl, $C_7$–$C_{12}$ aralkyl;

$n_1$=1–2

M is a multivalent metal ion;

a represents the valence of M; and $R_2$ is

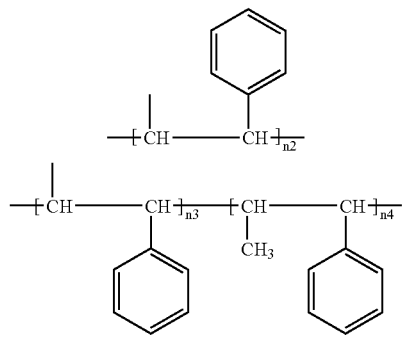

wherein $n_2$ is an integer from 1–100; $n_3$ is an integer from 1–100; and $n_4$ is an integer from 1–100.

2. The color-developing agent resin composition of claim 1, wherein the content of the component 1 comprises about 5–50% by weight, and component 2 comprises about 95–50% by weight of the color-developing agent resin composition.

3. The color-developing agent resin composition of claim 1, wherein the content of the component 1 comprises about 10–30% by weight, and the content of the component 2 comprises about 90–70% by weight of the color-developing agent resin composition.

4. A color-developing agent resin emulsion comprising:
   (1) the color-developing agent resin composition of claim 1; and
   (2) an emulsifying agent.

5. The color-developing agent resin emulsion of claim 4, wherein the emulsifying agent is selected from the group consisting of a surfactant, a modified starch and a polyvinyl alcohol.

6. A method for preparing the color-developing agent resin composition of claim 1 comprising:
   (1) synthesizing the polymer of a substituted aryl carboxylic acid and an alkenyl benzene in the presence of a catalyst in an inert solvent by using a substituted aryl carboxylic acid or ester having a general formula (IV) and an alkenyl benzene as feedstocks, and reacting the polymer with a multivalent metal ion to form a multivalent metal salt polymer of substituted aryl carboxylic acid as an intermediate;

(IV)

wherein

R is $C_1$–$C_4$ linear alkyl, hydroxy or halogen;

(2) melting the mixture of a p-substituted phenol, the substituted aryl carboxylic acid or ester having a general formula (IV), a metal oxide and a catalyst, and reacting them to form a reaction product;

(3) adding the intermediate of step 1 to the reaction product of step 2, and reacting at about 80–150° C. for about 30–150 minutes to form a second reaction product;

(4) reacting the second reaction product of step 3 with an aldehyde under refluxing at about 80–130° C. for about 1–10 hours;

(5) dehydrating the product of step 4 at a temperature of about 90–150° C. under a vacuum at about 0.02–0.06 MPa to form a dehydrated product; and (6) cooling the dehydrated product and milling the dehydrated product to produce a particle.

7. The method of claim 6, wherein:
(a) the molar ratio of the substituted aryl carboxylic acid to the p-substituted phenol in step 2 is about 0.05–1.55:1 and the molar ratio of the metal oxide to the substituted aryl carboxylic acid is about 0.02–1.30:1;
(b) the molar ratio of the metal salt of substituted aryl carboxylate to the p-substituted phenol in step 3 is about 0.05–5.0:1; and
(c) the molar ratio of the aldehyde to the p-substituted phenol in step 4 is about 0.06–2.0:1.

8. The method of claim 6, wherein the inert solvent is selected from the group consisting of organochlorines, alcohols, ethers, and ketones.

9. The method of claim 8, wherein the inert solvent used is selected from the group consisting of chloroethane, dichloroethane, trichloromethane, methanol, ethanol, propanol, butanol, isopropanol, isobutanol, dipropyl ether, diisopropyl ether, dibutyl ether, diisoamyl ether, acetone, butanone, pentanone, hexanone, hexanedione, heptanone and cyclohexanone.

10. The method of claim 6, wherein the p-substituted phenol is selected from the group consisting of alkylphenol, arylphenol and aralkylphenol, or a mixture thereof.

11. The method of claim 10, wherein the p-substituted phenol used is selected from the group consisting of p-methylphenol, p-ethylphenol, p-propylphenol, p-butylphenol, p-tert-butylphenol, p-amylphenol, p-hexylphenol, p-heptylphenol, p-octylphenol, p-tert-octylphenol, p-nonylphenol, p-decylphenol, p-undecylphenol, p-dodecylphenol, p-chlorophenol, p-bromophenol, p-phenylphenol and p-phenylalkyl phenol, or a mixture thereof.

12. The method of claim 6, wherein the aldehyde is selected from the group consisting of formaldehyde, acetaldehyde, propionaldehyde, butyraldehyde, amylaldehyde and benzaldehyde.

13. The method of claim 6, wherein the aldehyde is formalin comprising about 37% by weight to about 50% by weight.

14. The method of claim 6, wherein the substituted aryl carboxylic acid is selected from the group consisting of $C_1-C_4$ linear alkylphenyl carboxylic acid, halophenyl carboxylic acid and salicylic acid, or an ester thereof.

15. The method of claim 6, wherein the metal oxide is an oxide of metal selected from the group consisting of Mg, Ca, Cu, Cd, Al, Zn, Cr, In, Sn, Co, Ni, Ti and Ba.

16. The method of claim 6, wherein the metal salt of substituted aryl carboxylic acid is zinc salt.

17. The method of claim 6, wherein the catalyst is an acidic or a basic catalyst, or a specified surfactant.

18. The method of claim 6, wherein the alkenyl benzene is selected from the group consisting of vinyl benzene, propenyl benzene, butenyl benzene, butadienyl benzene, isobutenyl benzene and cyclo-alkenyl benzene and the like.

19. A method for preparing a color-developing agent resin emulsion comprising:

(1) a color-developing agent resin composition comprising:

Component 1: a phenolic resin comprising formula I:

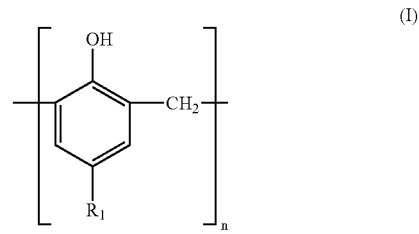

wherein n is an integer from 1 to 100; and

Component 2: a blend of graft copolymers of a phenolic resin and a multivalent metal salt polymer of a substituted aryl carboxylic acid, wherein at least a portion of said graft copolymers comprise formulas II and III

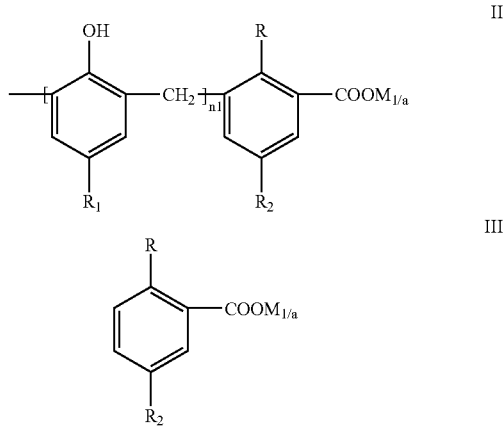

wherein
R is $C_1-C_4$ linear alkyl, hydroxy or halogen;
$R_1$ is individually $C_1-C_{12}$ linear or branched alkyl, $C_1-C_{12}$ halohydrocarbyl, $C_6-C_{12}$ aryl, $C_7-C_{12}$ aralkyl;
$n_1=1-2$
M is a multivalent metal ion;
a represents the valence of M; and
$R_2$ is

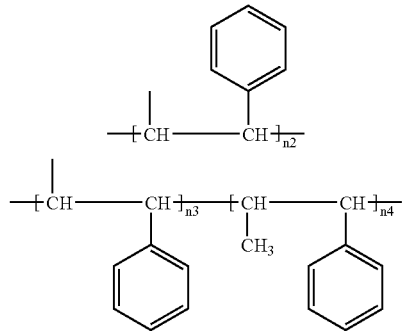

wherein $n_2$ is an integer from 1–100; $n_3$ is an integer of 1–100; and $n_4$ is an integer of 1–100; and (2) an emulsifying agent, wherein the color-developing agent resin composition is emulsified with the emulsifying agent in an emulsifying machine to obtain an oil-in-water emulsion with an average particle size of less than about 1.5 μm.

20. The method of claim 19, wherein the emulsifying agent comprises a surfactant, a modified starch or a polyvinyl alcohol.

21. A resin color-developing agent composition for no-carbon copying paper comprising (1) a color-developing agent resin comprising:

Component 1: a phenolic resin comprising formula I

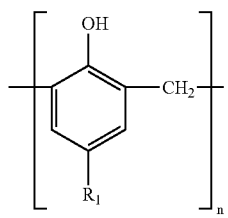
(I)

wherein n is an integer from 1 to 100; (I) and

Component 2: a blend of graft copolymers of a phenolic resin and a multivalent metal salt polymer of a substituted aryl carboxylic acid, wherein at least a portion of said graft copolymers comprise formulas II and III

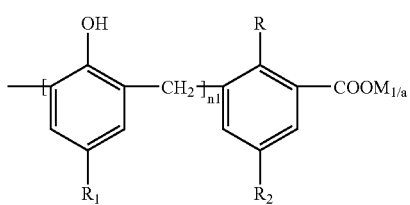
II

-continued

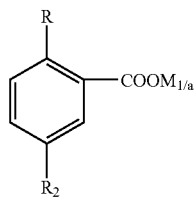
III wherein
R is $C_1$–$C_4$ linear alkyl, hydroxy or halogen;
$R_1$ is individually $C_1$–$C_{12}$ linear or branched alkyl, $C_1$–$C_{12}$ halohydrocarbyl, $C_6$–$C_{12}$ aryl, $C_7$–$C_{12}$ aralkyl;
$n_1 = 1$–$2$
M is a multivalent metal ion;
a represents the valence of M; and
$R_2$ is

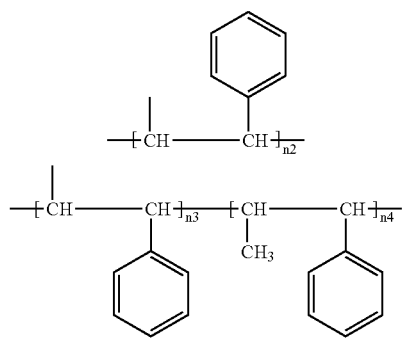

wherein $n_2$ is an integer from 1–100; $n_3$ is an integer of 1–100; and $n_4$ is an integer of 1–100; and (2) an emulsifying agent;

wherein the color-developing agent resin is emulsified with the emulsifying agent in an emulsifying machine to obtain an oil-in-water emulsion with an average particle size of less than about 1.5 μm.

22. The color-developing agent resin composition of claim 1, wherein $n_2$ is an integer from 1–10.

23. The color-developing agent resin composition of claim 1, wherein $n_3$ is an integer from 1–10 and $n_4$ is an integer from 1–10.

* * * * *